United States Patent [19]

Mägerle

[11] 4,132,331
[45] Jan. 2, 1979

[54] COLLAPSIBLE PACKING TUBE

[76] Inventor: Karl Mägerle, Im Vorderan Erb 1, 8700 Küsnacht, Switzerland

[21] Appl. No.: 698,783

[22] Filed: Jun. 22, 1976

[30] Foreign Application Priority Data

Jun. 27, 1975 [CH] Switzerland ............... 8370/75
Nov. 5, 1975 [CH] Switzerland .............. 14251/75

[51] Int. Cl.² ............................... B65D 35/10
[52] U.S. Cl. ............................ 222/107; 156/69; 156/306
[58] Field of Search ............... 222/107, 94, 92; 156/69, 306

[56] References Cited

U.S. PATENT DOCUMENTS

| 1,322,426 | 11/1919 | Gearhart | 222/107 |
| 2,119,926 | 6/1938 | Quittner | 222/107 X |
| 2,258,395 | 10/1941 | Tome | 222/107 |
| 2,789,731 | 4/1957 | Marrifino | 222/129 |
| 3,240,393 | 3/1966 | Jablonski | 222/94 |
| 3,260,411 | 7/1966 | Dobson | 222/107 |
| 3,356,263 | 12/1967 | Monroe | 222/107 |
| 3,465,917 | 9/1969 | Saeki | 222/107 |
| 3,700,513 | 10/1972 | Haberhauer et al. | 222/107 X |
| 3,798,094 | 3/1974 | Costa | 156/69 |

Primary Examiner—Robert B. Reeves
Assistant Examiner—H. Grant Skaggs
Attorney, Agent, or Firm—Cushman, Darby & Cushman

[57] ABSTRACT

A collapsible packaging tube in which the head and tube pipe are separately made at least partially of plastic material and in which a connecting partially plastic body overlaps and is welded to peripheral edges of the head and pipe. The tube pipe and connecting body have isolated metallic barriers. Process for making such a tube is also disclosed.

16 Claims, 6 Drawing Figures

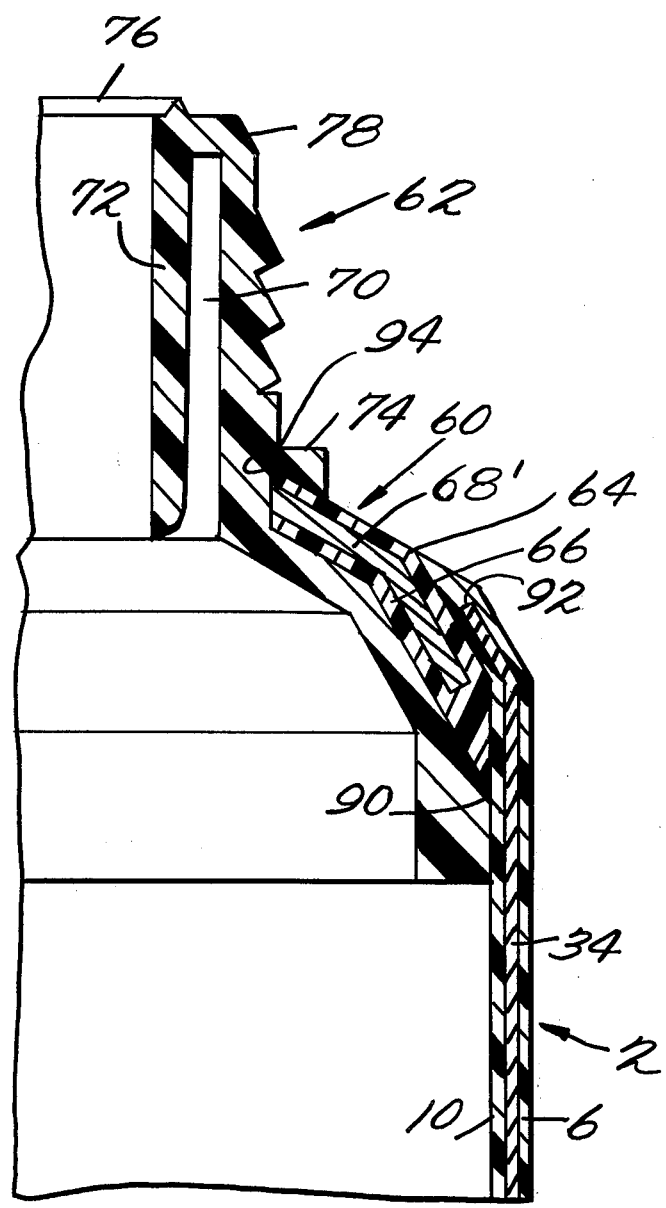

COLLAPSIBLE PACKING TUBE

The invention relates to a collapsible packaging tube with a tubular pipe and a tube head made independently of the former which is welded together with the pipe by use of thermoplastics on both sides.

Packaging tubes, the tubular pipe and tube head of which are made separately and are welded together as prefinished parts, have been known. The processes required for this are pertinent for the production of pure plastic tubes or of tubes with a metallic barrier sheet. As compared to those processes where the head of the tube is attached to the pipe of the tube, for example, by extrusion molding during forming, the first mentioned processes have the advantage that they can be carried out on less pretentious machines. Waiting times, which cause a sufficient solidification of agglomerations of plasticized plastics, are omitted in case of these processes.

However, both previously mentioned known processes have the weakness, that they can only be used in case of tubes, where the immediately adjacent parts of tube pipe and tube head consist of thermoplastically connectable plastics. Correspondingly, these processes cannot be used, for example, for the production of packaging tubes where the upper edge of the tube pipe encloses the shoulder of the tube head made of plastic and the inside of the tube pipe, at least if this upper edge does not consist of a thermoplastically connectable plastic. That is the case, for example, whenever the tubes are equipped with diffusion impeding barrier sheets.

A process has also been known, where the connection between a tube pipe consisting of composite material with a metal layer, and the head of the tube is produced by induction welding. Heat is produced by induction welding in the metallic layer of the tube pipe, which for this purpose extends up to the shoulder part and there overlaps the head part. At the same time one cannot prevent heat produced in this layer in the area of the shoulder, to be deflected also into areas where no heat is needed or where said heat may even have a harmful effect, because, for example, deformations, discolorations or even blisters in the composite foil can develop. Although measures, as for example cooling of the body of the tube during the welding process, have been known in connection with the abovementioned known process, the fact remains that comparatively considerably more heat must be produced than required for the welding process.

In many cases, the production of loss heat, i.e., of the heat deflected by the metal layer is not possible without prolongation of the cycle. It is not possible to produce any amount of heat for a brief time in a thin walled metal insert, without damaging the composite foil or even destroying it.

According to a known solution, either the end of the pipe is subdivided into several lobes which subsequently can be folded over the shoulder part, or else the end of the pipe is so narrowed down with folds, that the shoulder of the head part can be covered up with it. Both of these known solutions are difficult to produce rationally. Moreover, the danger exists that the currents induced in the individual lobes break through mutually and thereby burn the metal foil, while the cover of the shoulder formed by folding is inclined to break the folded metal foil under the pressure needed for the connection of the head and body parts, so that the diffusion-blocking effect is no longer sufficiently assured.

Additional known solutions propose to prevent the diffusion by means of a barrier insert injected in the head part or inserted in the head part. The effectiveness of these measures, however, depends essentially on how small the mutual distance of the barrier sheets of the shoulder part respectively of the body of the pipe can be maintained.

Therefore, the present invention is based on the task of creating a packaging tube which will satisfy high requirements for density especially in regard to diffusion with the smallest possible costs of production. Furthermore, the packaging tube is to be suitable also for chemically non-neutral fillings, which would attack, for example, a metal such as aluminum.

According to the invention this task is solved by a connecting body which is formed at least partly of plastic, which overlaps mutually adjacent peripheral edges of the pipe of the tube and the head of the tube.

By the use of annular connecting body, it is now possible to extend the range of use of such tubes to entirely different materials and arrangements. Thus, the possibilities of application increase to a larger extent, whenever the connecting body is developed in several layers.

A particularly favorable development of the packaging tube lies in the development of the connecting body at the same time to be a barrier sheet body. Thus, for example, in case of a tube pipe having a metallic barrier sheet, the connecting body can likewise have a metallic layer which extends, for example, up to the outlet of the tube. Such barrier sheet bodies serve, for example, as diffusion barriers.

Another development of the object of the invention concerns an arrangement that is advantageously simple to produce, for the safe sealing of the packaging tube by a tube cap.

Furthermore, the invention is concerned with a process for the production of a packaging tube by inductive heating of the connecting body containing a heat producing layer. A particular advantage of this solution is, that the heat producing layer can be developed blocking diffusion and that it can be extended in a simple manner and without interruption over the shoulder part up to the neck.

Several embodiments of the packaging tube of the invention as well as an arrangement of the production process are shown in the drawings.

FIG. 6 shows a partial further embodiment in axial cut.

Figure 1:
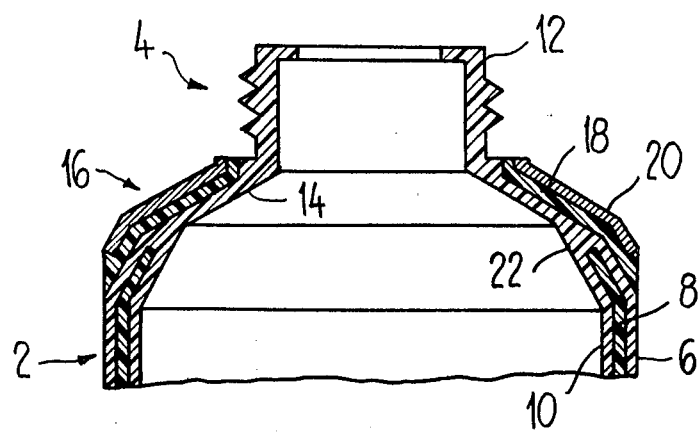
FIG. 1 shows a first embodiment in axial cut.

In FIG. 1, a packaging tube has a tube pipe 2, shown only in its terminal area on the side of the head, and a head 4. The tube pipe 2 consists of three layers, namely an outside layer 6 of polyethylene, a barrier sheet 8 of polyester and an inside layer 10, likewise of polyethylene. The layers, formed of adhesive agents such as, for example, copolymers, which can be used in order to produce lasting laminated connections between materials of the barrier sheet and outside layers consisting mostly of thermoplastics, have not been considered in the drawings.

The head 4 has an outlet 12 provided with a thread and an adjacent shoulder part 14 and is produced from polyethylene in a known manner by injection molding.

The pipe 2 of the tube is united with the head 4 by a connecting body 16 which is in the form of a gasket. The connecting and circular ring-shaped body 16 overlaps from the outside both the upper end of the tube pipe 2 as well as the shoulder part 14. The connecting body 16 at the same time has two main layers, namely a barrier sheet 18 of polyester and a cover layer 20 of a thermoplastic resin. The exact nature of the polyester which forms sheet 18 is not critical, and may be, e.g., polyethylene terephthalate ("Dacron" sold by du Pont); also contemplated is the use of "Mylar" sold by du Pont or "Hostaphan" (trademark), a material sold by Hoechst. Certain acrylo type copolymers, e.g., acryl niryl, sold by Vistron Corporation of Cleveland under the trade name "Barex," are equally suitable for use as the polyester layer. By "thermoplastic" is usually meant polyethylene, which is the preferred thermoplastic for economic reasons; however, other thermoplastics such as polyvinylchloride, nylons, fluorocarbons, linear polyethylene, polyurethane prepolymer, polystyrene, polypropylene, cellulosic and acrylic resins may be used; economic factors are the only determinative ones with respect to the use of these thermoplastic resins which are conventionally used as packaging materials.

In order to improve the adhesion to the cover layer 20 and especially to the overlapped shoulder part 14 and the overlapped outside layer 6, the polyester of the barrier sheet 18 is coated on both sides with a layer of copolymer, e.g., ethylene vinyl acetates (sold by du Pont) under the designations XBR 910, 920 and 950, as well as the polymer material Alathon, also sold by du Pont. In subsequent embodiments, mention of a particular material included in this or the preceding paragraph is to be understood as an example for which any of the corresponding materials can be substituted.

The fusion of the connecting body 16 with the tube pipe 2 and the head 4 takes place preferably in the same operating step. For example, the contact surfaces of these parts are fused by radiation heat and are then compressed, for example, in a two-part mold. Polyethylene material 22 results as a displacement from polyethylene layers 6 and 10 during the heat and pressure action.

Figure 2:
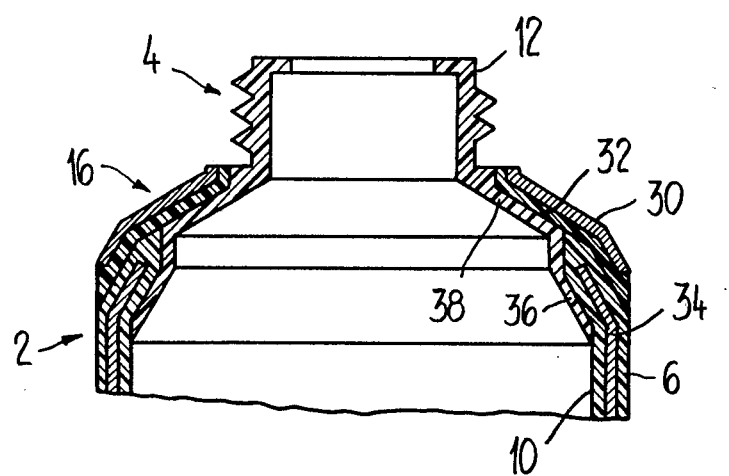
FIG. 2 shows a second embodiment with metallic barrier layer in axial cut.

The embodiment shown in FIG. 2 of a packaging tube differs from that of FIG. 1 especially in arrangement and material of the barrier sheet on the connecting body 16. The barrier sheet in this instance is the outside layer 30, preferably of aluminum, and the inside layer 32 is a thermoplastic, for example polyethylene. The polyethylene layer can be laminated to the aluminum layer in a known manner by means of a layer of the aforementioned copolymer.

The tube pipe 2 has a barrier sheet 34 of metal, e.g., preferably of aluminum, located between the polyethylene layers 6 and 10, instead of a barrier sheet of polyester. Aluminum is preferably used for barrier 34 (and also for barrier 30 in connecting body 16 as well as for barriers in subsequent embodiments wherein aluminum is preferably used) because it is inexpensively available as a thin foil of approximately 400 millimeters thickness. Various metals can probably be substituted for the aluminum of sheet 34 (or 30), e.g., iron metal type, if the higher cost of these substitutes is acceptable. The upper edge of the tube pipe 2 has been overlapped by a collar part 36, twice recessed with regard to a shoulder part 38 on its inside, which will prevent the filler material from coming into contact with the aluminum of the barrier sheet 34.

The production process for the packaging tube as in FIG. 2 is particularly simple, since heating of the thermoplastics can be accomplished directly by contact heating on the aluminum barrier sheet 30. For example, head part 4, tube pipe 2 and connecting body 16 (in this order) can be attached successively on a mandrel, with which cooperates a matrix, heated in correspondence with the final shape of the connecting body.

Figure 3:
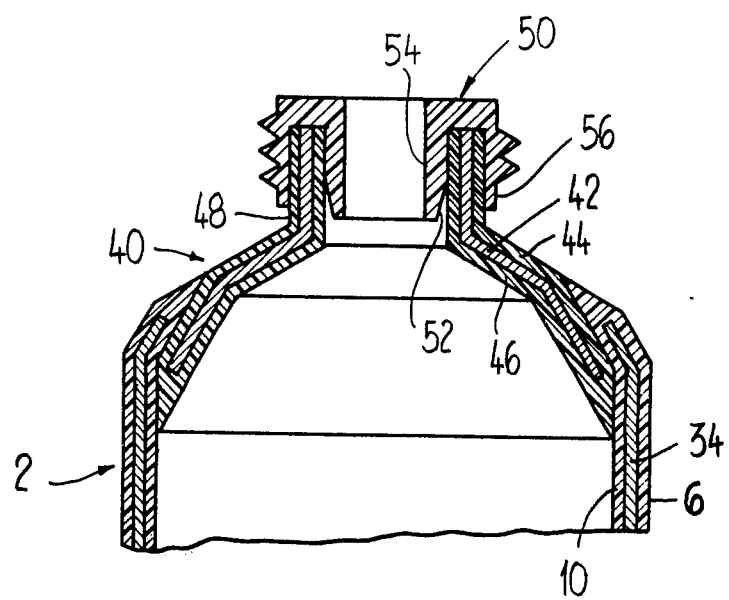
FIG. 3 is a third embodiment in axial cut.

FIG. 3 shows an embodiment with a tube pipe 2, the structure of which corresponds to that of FIG. 2, and which is overlapped by a connecting body 40 on its inside. The connecting body consists of an aluminum barrier sheet 42 as well as an outside layer 44 and an inside layer 46 of polyethylene and is formed with a cylindrical neck part 48. A tube head 50 consisting of polyethylene is disposed on the neck part 48. The neck part 48 at the same time engages with an annular groove 52 in the tube head 50, developed as an outlet. The tube head 50 is divided by the annular groove 52 inward into a casing 54 and outward into a collar 56. For the purpose of fixation, at least the inside layer 46 of the connecting body 40 is welded together with the adjacent surface of the casing 54. The collar 56 has been provided as customary, with a thread for screwing on of a closing cap, not shown.

Figure 4:
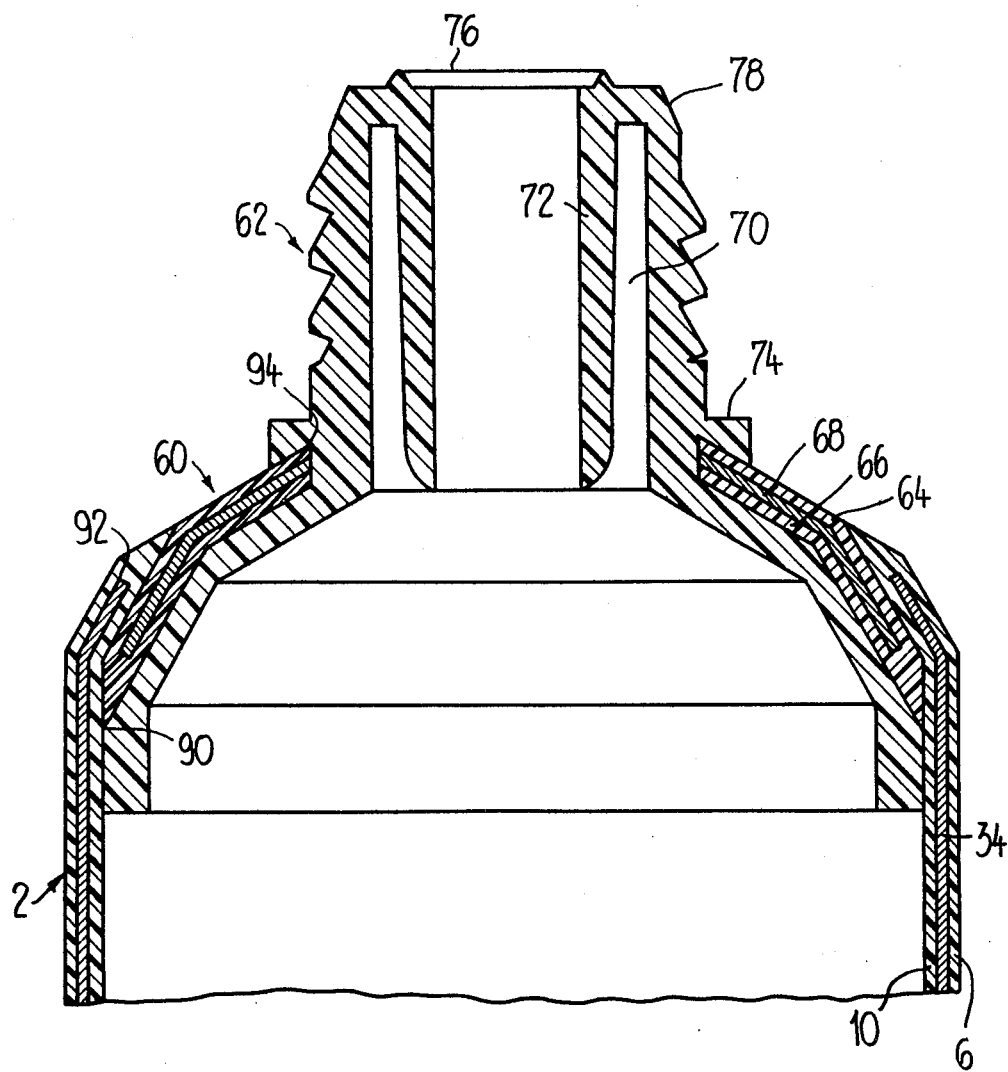
FIG. 4 is a fourth embodiment in axial cut.

FIG. 4 shows another embodiment with a tube pipe 2, a connection 60 and a head part 62. The tube pipe 2 is again made up of a three-layered composite material, the inside layer 10 and the outside layer 6 of which consist preferably of polyethylene, the middle layer 34 of metal preferably of aluminum. The connecting body 60 consists of a three-layer composite material, namely of an outside layer 64 and an inside layer 66, as well as of a barrier sheet 68. The barrier sheet 68 is made preferably of an aluminum alloy. The layers 64 and 66 are hot-sealing layers, which consist preferably of polyethylene or of a copolymer, adhering well to the aluminum layer. The head part 62 is a molded body, consisting of plastic, such as, for example, polyethylene, which is produced in a known manner by injection molding.

The thread part of the head 62 can have an annular groove 70, as a result of which a casing 72 is formed which prevents any quick flow-back of the filler material immediately after extraction. As a result of that any entry of air harmful for the filler material can be avoided. Also, the annular groove 70, developed in this embodiment, can be filled by a ring, not shown, made of a material and diffusion-blocking properties.

The head part 62, furthermore has a shoulder 74, which serves as a stop and as a first sealing surface for a closing cap, not shown, which can be screwed on. A further sealing surface cooperating with the closing cap can only be effective, if it were developed elastically. For this purpose the closing cap can be dimensioned such, that it presses with its inside base surface onto an annular sealing lip 76, disposed on the head part 62. Another possibility for an additional sealing surface is offered by a bevel 78 above the outside thread on the head part 62, which bevel must be adapted to the closing cap. The sealing lip 76 or else the bevel 78 act in connection with a sealing cap of plastics as elastic seals which can compensate within certain limits for a finishing tolerance.

While consequently, the connecting body 16, 40, 60 in case of the embodiments shown, has a double function, namely to extend the barrier layer, present in the tube pipe 2, to the shoulder part of the tube, the embodiment as in FIG. 3 brings a further extension of the barrier layer into the outlet. Correspondingly such a tube is particularly well suited for sensitive filler materials.

While in the embodiment of FIG. 2, a direct connection between the tube pipe 2 and the head 4 comes about practically per force because of the development and the selection of material, such is not at all necessary, as the embodiment of FIG. 3, shows especially clearly. The rigidity of the connecting body 16, 40, 60 cannot only be influenced by change of the wall thickness, but also by selection and disposition of the layers.

Basically, it is naturally also possible, to integrate the head in the connecting body in such a way, so that a special injection molded part and connecting process for it is omitted.

In case of the embodiment as in FIG. 3, it is obvious to weld the head 50 to the connecting body 40, for example, by frictional heat, before the connection with the tube pipe 2 is established.

Connecting bodies 16 as in embodiments of FIGS. 1 and 2, can be prefabricated by a stamping and coining respectively deep drawn operation from laminate material. In case of the connecting body 40 as in FIG. 3, a production by the multi-layer process comes into question, whereby the rolled laminated tube is stamped out from a proper laminate and then the edges are joined into a ring by an overlap seam.

Naturally, the bodies of the tubes too can be produced by the multi-layer process.

It is also to be noted that in the embodiment of FIG. 3 too, the metallic barrier sheet 42 is isolated well inside the tube vis-a-vis the filler material by the overflow formed by the plastic layer 46 during welding together.

Figure 5:
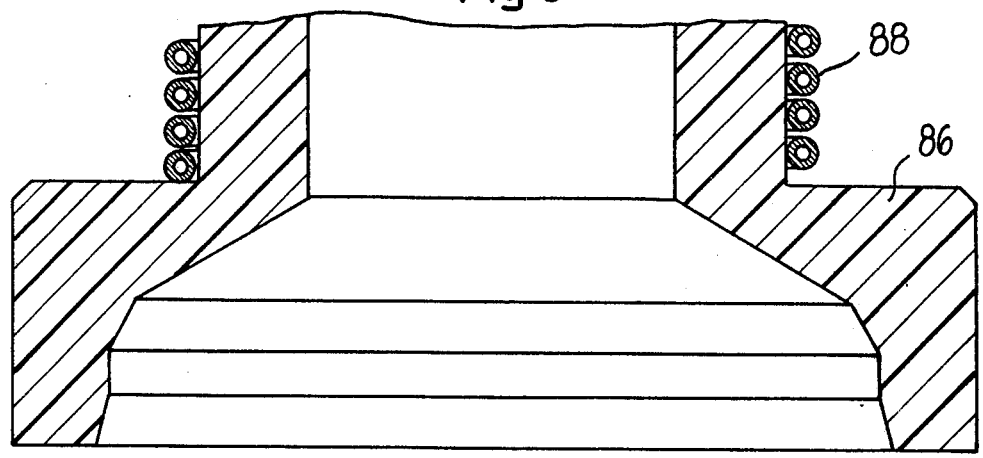
FIG. 5 is a cut through the individual parts of the packaging tube of FIG. 4 prior to welding it, together with an arrangement for the production of the welded connection.
Figure 5:
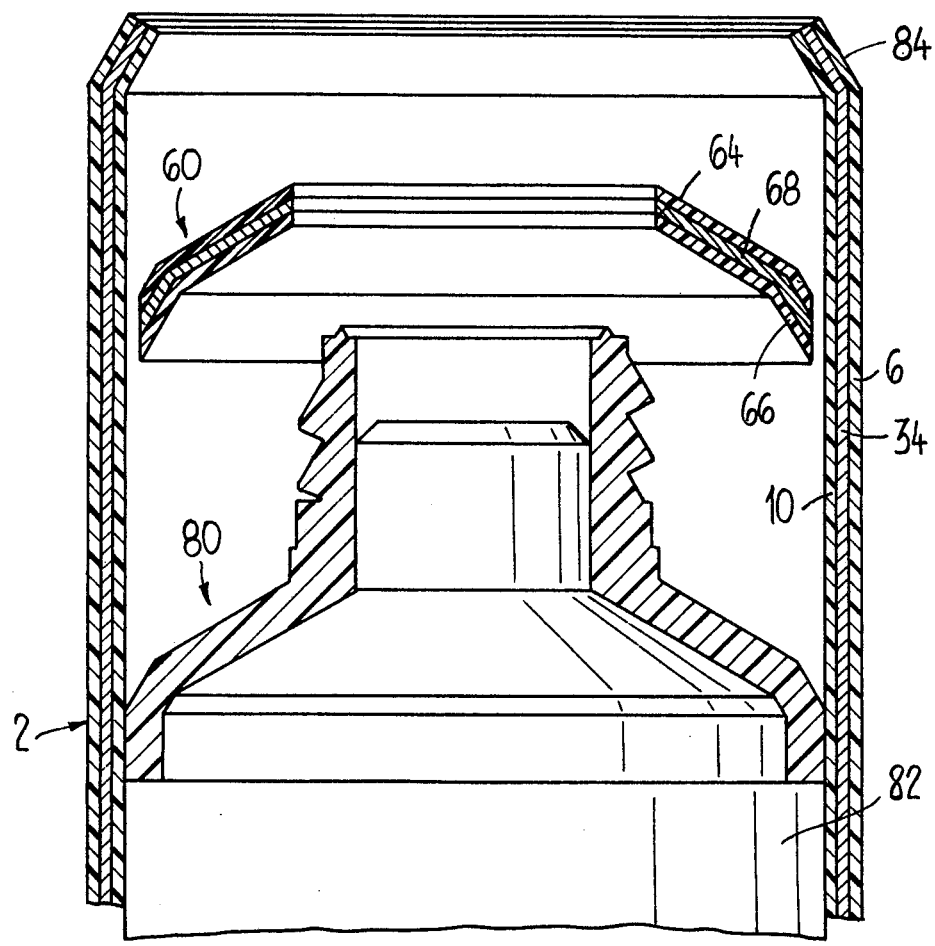

A process, suitable for the production of the packaging tube similar to that described in FIG. 4, is shown in FIG. 5. This process relates exclusively to embodiments, the connecting bodies 60 of which have an inductively responding heat producing layer, such as, for example, a metal layer.

As becomes clear from FIG. 5, a head part 80 is disposed on a supporting mandrel 82. Subsequently the connecting body 60 is placed in a suitable manner on the head part 80 and the tube pipe 2 is also brought into a suitable welding position with constriction 84 adjacent the lower end of body 60. Finally the heat necessary for the connection as well as the pertinent pressure are produced by means of a compression tool 86 with an induction coil 88 for producing an electromagnetic high frequency field.

It is obvious, that the processing steps must not necessarily take place in the sequence described above. Particularly, it is also possible to produce, for example, first the connection between the connecting body 60 and the head part 80 or the tube pipe 2 and the connecting body 60, separately.

This method of arrangement and proceeding will permit the production of the needed welding heat exclusively in the connecting body 60. This can be accomplished in embodiments in which the connecting body contains a considerably thicker metal layer 68' (FIG. 6) than the tube pipe 2, as a result of the fact that the frequency needed for the inductive heating is synchronized with a thicker metal layer, located in the connecting body 60, so that the metal layer in the tube pipe 2 will practically not heat up.

A further possibility consists in the concentration of the magnetic fields in the area of the connecting body be a suitable development of the inductor. Finally, the concentration of the magnetic field can still be considerably reinforced by the use of magnetically conductive material operating as much as possible without loss, such as ferrite and powder cores.

Instead of the arrangement of FIG. 5, it is also possible to dispose the induction source in the mandrel 82 and to screen the field possibly in the area of the tube pipe 2. Since this arrangement offers the possibility of making the compression tool from metal, it will be possible as a result to shorten the cooling time after the welding process considerably.

As a result of the process described, cutting edges 90, 92 and 94, shown in FIG. 4 are covered up in such a way by overflowing plastics, that a direct contact between the filler material and the metal can never take place and that no open cutting edges will be visible even on the outside of the tube.

A particular advantage of the embodiment shown in FIG. 4, is that the distance of the barrier sheets 34, 68 respectively of the tube pipe 2 and connecting body 60 forming the shoulder part, can be kept small and the overlapping of the barrier sheets 34, 68 can be kept as large as possible. As a result of that the diffusion path is correspondingly large, so that a good diffusion impeding effect will be achieved.

What is claimed is:

1. Process for the production of a packaging tube including a tube pipe and a head shoulder portion produced independently of the former, said tube pipe being formed of a composite material containing a metal layer and said pipe and head shoulder portion having opposed thermoplastic layers, characterized by
    interposing a thermoplastic covered heat producing layer substantially intermediate said head shoulder portion and tube pipe including heat isolating the heat producing layer from the metal layer of the tube pipe, and
    heating said heat producing layer by induction substantially to the exclusion of said pipe metal layer to cause the said opposed thermoplastic layers of said tube pipe and head shoulder portion to be welded respectively to opposite sides of said interposed thermoplastic covered layer.

2. Process for the production of a packaging tube including a tube pipe and a shoulder portion produced independently of the former, said tube pipe being formed of a composite material containing a metal layer and said pipe and shoulder portion having adjacent theremoplastic layers,
    characterized in that a heat producing layer is disposed in the shoulder portion so as to be isolated from the metal layer of the tube pipe, and said heat producing layer is heated by induction substantially to the exclusion of said pipe metal layer to cause the adjacent thermoplastic layers to be welded together,
    and further characterized in that said heat producing layer is considerably thicker than said pipe metal layer and an electromagnetic high frequency field is used for achieving the induction, the frequency of said field being substantially more related to the thickness of said heat producing layer than the said pipe metal layer.

3. A collapsible packaging tube comprising:
a tube pipe, including an inwardly turned upper end, made at least partially of plastic material,
a tube head including an outwardly sloping shoulder portion, made at least partially of plastic material, and
an annular connecting body having a truncated cone shape and containing a plurality of layers including a barrier sheet,
said body being welded in a position between a side of said inwardly turned upper end of said tube pipe and an opposing side of said outwardly sloping shoulder portion of said tube head so as to be welded to said shoulder portion at at least a location radially inwardly of its weld to said upper end of said tube pipe.

4. A collapsible packaging tube comprising:
a tube pipe, including an inwardly turned upper end, made at least partially of plastic material,
a tube head including an outwardly sloping shoulder portion, made at least partially of plastic material, and
an annular connecting body having a truncated cone shape and containing a plurality of layers including a barrier sheet,
said body being welded between a side of said inwardly turned upper end of said tube pipe and a side of said outwardly sloping shoulder portion of said tube head so as to be welded to said shoulder portion at at least a location radially inwardly of its weld to said upper end of said tube pipe,
wherein said connecting body overlaps the outer side of said shoulder portion but underlies the inner side of said inwardly turned upper end of said tube pipe.

5. Packaging tube as in claim 4 wherein said tube head has an annular shoulder serving as a cap sealing surface and also has an elastic sealing lip serving as a cap elastic seal.

6. A tube as in claim 5 wherein said body includes three layers the central one of which is said barrier layer, the outside layers being plastic.

7. A tube as in claim 6 wherein said barrier layer is metal.

8. A tube as in claim 7 wherein said tube pipe is multilayered with a central layer being metal, the central metal layer of said connecting body being isolated from and considerably thicker than the central metal layer of said pipe.

9. Process for producing the tube of claim 8 including the steps of:
disposing said tube head over a mandrel shaped to fit inside said head and its said shoulder portion,
disposing said connecting body over and down onto said shoulder portion,
disposing said tube pipe around said connecting body with said inwardly turned upper end in contact with said shoulder portion,
generating welding heat substantially exclusively in said connecting body by an inductive heating frequency which is substantially more related to the thickness of said thicker central metal layer of said body than the metal layer of said pipe while pressing downwardly on the assembled head, body and pipe while keeping said metal layers of said body and pipe isolated to cause the adjacent plastic layers of said head and pipe to be welded to said connecting body.

10. A tube as in claim 7 wherein said tube pipe is multilayered with a central layer being metal, the central metal layer of said connecting body being isolated from the central metal layer of said pipe.

11. Process for producing the tube of claim 10 including the steps of:
disposing said tube head over a mandrel shaped to fit inside said head and its said shoulder portion,
disposing said connecting body over and down onto said shoulder portion,
disposing said tube pipe around said connecting body with said inwardly turned upper end in contact with said shoulder portion, and concentrating welding heat substantially exclusively in said connecting body while pressing the assembled head, body and pipe together while keeping said metal layers of said body and pipe isolated to cause the adjacent plastic layers of said head and pipe to be welded to said connecting body.

12. A tube as in claim 5 wherein said shoulder portion and truncated cone body are each formed of upper and lower sections with the lower sections being more steeply inclined than the upper sections and the upper end of said tube pipe forms a smooth transition to the body upper section at the upper end of the body lower section.

13. A collapsible packaging tube comprising:
a tube pipe made of a multi-layer material with an innermost layer made of plastic and an intermediate layer made of metal, and including an inwardly turned upper end,
a tube head including an outwardly sloping shoulder portion, made at least partially of plastic material, said sloping shoulder portion having an outer side, and
an annular connecting body having a truncated cone shape and containing a plurality of layers including a metallic barrier sheet and an innermost layer and an outermost layer, each made of plastic and located on opposite sides of said metallic barrier sheet,
said body overlapping said outwardly sloping shoulder portion of said tube head with said innermost layer thereof being welded to said sloping shoulder portion at said outer side and said inwardly turned upper end of said tube pipe overlapping said body with said outermost layer of said body being welded to said innermost layer of said tube pipe.

14. A tube as in claim 13 wherein said shoulder portion and truncated cone body are each formed of upper and lower sections with the lower sections being more steeply inclined than the upper sections and the inwardly turned upper end of said tube pipe forms a smooth transition to the body upper section at the upper end of the body lower section.

15. A tube as in claim 14 wherein said inwardly turned upper end of said tube pipe has an uppermost outer surface which slopes at substantially the same inclination as the said upper section of said connecting body to cause said smooth transition to be included in substantially a straight line coinciding with the outside of said body upper surface and said uppermost outer surface of said tube body.

16. A tube as in claim 13 wherein the uppermost portion of the outer side of said inwardly turned upper end of said tube pipe defines a first frusto-conical profile portion and wherein radially inwardly thereof the outer side of said connecting body forms a second frusto-conical profile portion less steeply inclined than the first frusto-conical profile portion.

* * * * *